(12) United States Patent
Nammi et al.

(10) Patent No.: US 9,883,528 B2
(45) Date of Patent: Jan. 30, 2018

(54) METHOD TO TRANSMIT SIGNALING RADIO BEARER MESSAGES IN MULTI ANTENNA WIRELESS COMMUNICATION SYSTEM

(71) Applicant: TELEFONAKTIEBOLAGET L M ERICSSON (PUBL), Stockholm (SE)

(72) Inventors: Sairamesh Nammi, Kista (SE); Faris Mismar, Plano, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 120 days.

(21) Appl. No.: 14/660,735

(22) Filed: Mar. 17, 2015

(65) Prior Publication Data
US 2016/0278119 A1 Sep. 22, 2016

(51) Int. Cl.
*H04W 74/00* (2009.01)
*H04B 7/06* (2006.01)
*H04B 7/0413* (2017.01)
*H04B 7/08* (2006.01)
*H04W 72/06* (2009.01)
(Continued)

(52) U.S. Cl.
CPC ........ *H04W 74/002* (2013.01); *H04B 7/0413* (2013.01); *H04B 7/063* (2013.01); *H04B 7/0617* (2013.01); *H04B 7/0817* (2013.01); *H04W 72/06* (2013.01); *H04W 88/02* (2013.01); *H04W 88/08* (2013.01)

(58) Field of Classification Search
CPC .. H04B 7/0413; H04B 7/0817; H04B 7/0617; H04B 7/063; H04W 72/06; H04W 74/002; H04W 88/02; H04W 88/08
See application file for complete search history.

(56) References Cited

U.S. PATENT DOCUMENTS 8,369,290 B2 * 2/2013 Xing ............... H04K 3/226
                                                  370/334
8,654,816 B2   2/2014 Zhang
(Continued)

FOREIGN PATENT DOCUMENTS

EP   2249599 A1   11/2010
EP   2738950 A2   6/2014

OTHER PUBLICATIONS

3GPP TS 36.331 V8.0.0 (Dec. 2007); 3rd Generation Partnership Project; Technical Specification Group Radio Access Network; Evolved Universal Terrestrial Radio Access (E-UTRA) Radio Resource Control (RRC); Protocol specification (Release 8).
(Continued)

*Primary Examiner* — Rina Pancholi
(74) *Attorney, Agent, or Firm* — Baker Botts, LLP

(57) ABSTRACT

A method in a network node is disclosed. The method comprises receiving channel state information from a user equipment, the channel state information comprising a first transmission rank reported by the user equipment for downlink transmission of a packet. The method further comprises determining whether the packet is a signaling bearer packet or a data bearer packet, and upon determining that the packet is a signaling bearer packet, modifying the first transmission rank to a second transmission rank, the second transmission rank comprising a lower rank than the first transmission rank reported by the user equipment.

22 Claims, 10 Drawing Sheets

(51) Int. Cl.
  *H04W 88/02* (2009.01)
  *H04W 88/08* (2009.01)

(56) References Cited

U.S. PATENT DOCUMENTS

| | | | | |
|---|---|---|---|---|
| 2010/0330995 | A1* | 12/2010 | Aoyama | H04W 28/10 455/436 |
| 2012/0114021 | A1* | 5/2012 | Chung | H04B 7/155 375/211 |
| 2012/0207084 | A1* | 8/2012 | Seo | H04B 7/155 370/315 |
| 2013/0215988 | A1* | 8/2013 | Nagata | H04L 25/03343 375/267 |
| 2013/0288624 | A1 | 10/2013 | Mujtaba | |
| 2013/0301560 | A1* | 11/2013 | Geirhofer | H04B 7/0621 370/329 |
| 2014/0153427 | A1* | 6/2014 | Seo | H04L 1/20 370/252 |

OTHER PUBLICATIONS

3GPP TS 36.213 V8.0.0 (Sep. 2007); 3rd Generation Partnership Project; Technical Specification Group Radio Access Network; Evolved Universal Terrestrial Radio Access (E-UTRA); Physical layer procedures (Release 8).

3GPP TS 36.211 V8.9.0 (Dec. 2009); 3rd Generation Partnership Project; Technical Specification Group Radio Access Network; Evolved Universal Terrestrial Radio Access (E-UTRA); Physical Channels and Modulation (Release 8).

* cited by examiner

METHOD TO TRANSMIT SIGNALING RADIO BEARER MESSAGES IN MULTI ANTENNA WIRELESS COMMUNICATION SYSTEM

TECHNICAL FIELD

The present disclosure relates, in general, to wireless communications, and, more particularly, to a method to transmit signaling radio bearer messages.

BACKGROUND

3GPP LTE represents the project within the third generation partnership project, with an aim to improve the UMTS standard. The 3GPP LTE radio interface offers high peak data rates, low delays, and an increase in spectral efficiencies. The LTE system supports both Frequency Division Duplex (FDD) and Time Division Duplex (TDD). This enables operators to exploit both the paired and unpaired spectrum, since LTE has flexibility in bandwidth as it supports 6 bandwidths: 1.4 MHz, 3 MHz, 5 MHz, 10 MHz, 15 MHz, and 20 MHz.

The LTE physical layer is designed to achieve higher data rates. This is facilitated by turbo coding/decoding, and by higher order modulations (up to 64-QAM). The modulation and coding is adaptive, and depends on channel conditions. Orthogonal frequency division multiple access (OFDMA) is used for the downlink, while single carrier frequency division multiple access (SC-FDMA) is used for the uplink. The main advantage of such schemes is that the channel response is flat over a sub-carrier, even though the multi-path environment could be frequency selective over the entire bandwidth. As a result, the complexity involved in equalization is reduced, as simple single tap frequency domain equalizers can be used at the receiver. OFDMA allows LTE to achieve its goals of higher data rates, reduced latency, and improved capacity/coverage, with reduced costs to the operator. The LTE physical layer supports Hybrid Automatic Repeat Request (HARQ), power weighting of physical resources, uplink power control, and multiple input multiple output (MIMO). By using multiple parallel data stream transmission to a single terminal, the data rate can be increased significantly.

MIMO is an advanced antenna technique to improve spectral efficiency, thereby boosting the overall system capacity. The MIMO technique uses a commonly known notation (M×N) to represent MIMO configurations in terms of the number of transmit antennas (M) and receive antennas (N). The common MIMO configurations used or currently discussed for various technologies are: (2×1), (1×2), (2×2), (4×2), (8×2) and (2×4), (4×4), (8×4). The multiple input single output (MISO) and single input multiple output (SIMO) configurations represented by (2×1) and (1×2), respectively, are special cases of MIMO.

It is well known that MIMO systems can significantly increase the data carrying capacity of wireless systems. MIMO can be used for achieving diversity gain, spatial multiplexing gain and beamforming gain. For these reasons, MIMO is an integral part of the 3rd and 4th generation wireless systems. In addition, massive MIMO systems are currently under investigation for 5G systems.

FIG. 1 is a schematic diagram of multi-antenna transmission in LTE. More particularly, FIG. 1 illustrates data modulation 5A and 5B, antenna mapping 10, antenna ports 15, OFDM modulator 20, and antennas 25. Antenna mapping 10 can, in general, be described as a mapping from the output of data modulation 5A and 5B to different antenna ports 15. In the example illustrated in FIG. 1, there may be up to eight antenna ports 15. The input to antenna mapping 10 consists of modulation symbols (e.g., QPSK, 16QAM, 64QAM, 256QAM etc.) corresponding to the one or two transport blocks. More specifically, there is one transport block per Transport Time Interval (TTI), except for spatial multiplexing, in which case there may be two transport blocks per TTI. The output of the antenna mapping 10 is a set of symbols for each antenna port 15. The symbols of each antenna port 15 are subsequently applied to the OFDM modulator 20. In other words, the symbols of each antenna port 15 are mapped to the basic OFDM time-frequency grid corresponding to that antenna port 15. The output of OFDM modulators 20 may then be transmitted by antennas 25. For example, data may be transmitted by antennas 25 to a user equipment (UE).

FIG. 2 illustrates an example signal flow diagram for downlink data transfer in LTE. At step 205, UE 110 receives pilot or reference signals transmitted by network node 115, such as an eNodeB. From the pilot or reference signals, UE 110 computes channel estimates, and then computes the parameters needed for channel state information (CSI) reporting. The CSI report may include, for example, a channel quality indicator (CQI), a precoding matrix indicator (PMI), and rank information (RI) (see TS 36.213 V8.8.0, section 7.2).

At step 210, UE 110 sends the CSI report to network node 115 via a feedback channel, such as, for example, the physical uplink control channel (PUCCH) or the physical uplink shared channel (PUSCH). The PUCCH may be used for periodic CSI reporting, while the PUSCH may be used for aperiodic reporting. A scheduler associated with network node 115 uses this information in choosing the parameters for scheduling of UE 110. At step 215, network node 115 sends the scheduling parameters to UE 110 in the downlink control channel called physical downlink control channel (PDCCH). At step 220, actual data transfer takes place from network node 115 to UE 110. Data transfer between network node 115 and UE 110 may continue for any suitable period of time. In certain circumstances, however, it may become necessary for UE 110 to be handed over from network node 115 to another network node (i.e., a target network node). The handover (HO) procedure is described in more detail below.

FIG. 3 illustrates an example signal flow diagram of LTE handover. More particularly, FIG. 3 illustrates the Inter-eNode B intra-frequency LTE HO. At steps 302 and 304, downlink and uplink user data is transmitted between UE 110 and source network node 115A. At step 306, UE 110 transmits an RRC MEASUREMENT REPORT A3 (intra-LTE) or A2 (inter-LTE) message. As disclosed in TS 36.331 V8.21.0, section 5.5, UE 110 may send the RRC MEASUREMENT REPORT when UE 110 is on the cell border.

At step 308, source node 115A sends a handover request (over an internode interface, such as X2, if setup), which target node 115B acknowledges at step 310. At step 312, source node 115A sends an RRC Connection Reconfiguration message in response to target node 115B's acknowledgement. The RRC Connection Reconfiguration message is referred to as the signaling radio bearer message (SRB). The SRB instructs UE 110 to the new cell by means of the PCI, carrier frequency, antenna ports, etc.

At step 314, source node 115A sends an eNB_Status_Transfer message to target node 115B. At step 316, UE 110 sends a Random Access Preamble message to target node 115B, and at step 318 target node 115B sends a Random Access Response message to UE 110. At step 320, UE 110 sends a Random Access Msg3 message to target node 115B, and at step 322 target node 115B sends a Contention Resolution (UL Grant) message to UE 110.

At step 324, UE 110 sends an RRC Connection Reconfiguration Complete message to target node 115B when it has added the new radio link (e.g., through contention). Steps 326 and 328 illustrate the exchange of Path_Switch_Request and Path_Switch_Request_Acknowledgement messages between target node 115B and core network node 130. At steps 330 and 332, downlink and uplink user data is exchanged between UE 110 and target node 115B. At step 334, target node 115B sends a RRC Connection Reconfiguration message to UE 110, and at step 336, UE 110 sends an RRC Connection Reconfiguration Complete message to target node 115B. At step 338, target node 115B sends a UE Context Release Command to source node 115A.

When network nodes 115A and 115B are deployed with multiple antennas, and UE 110 is configured to receive the SRB transmission from multiple antennas, the HO performance becomes more critical. This is because there are cases when UE 110 reports higher transmission rank at the cell edges. The interference pattern, however, can change dynamically at the cell edge. For example, at the time of CSI reporting there might be less interference in the neighbor cell 115B, while at the time of data transfer (both data and signaling) there might be high interference. In such a case, packets may get an error, and HARQ might be useful. Retransmitting SRBs, however, is costly in terms of payload, and signaling messages are delay sensitive, which eventually impacts the HO performance.

Typically, HO performance and call retainability are key performance indications (KPIs) when setting up a new mobile network. Dropped calls and long HO interruption would be very annoying for customers. This can badly impact a customer's willingness to continue subscriptions. In both homogeneous and heterogeneous networks (including macro, micro, and pico cells), HOs typically occur on cell edge. Usually, the HO fails due to transmission failure of key HO signaling messages, such as, for example, the RRC Connection Reconfiguration message. Thus, there is a need for a more reliable method of transmitting key signaling messages.

SUMMARY

To address the foregoing problems with existing solutions, disclosed is a method in a network node. The method comprises receiving channel state information from a user equipment, the channel state information comprising a first transmission rank reported by the user equipment for downlink transmission of a packet. The method further comprises determining whether the packet is a signaling bearer packet or a data bearer packet, and upon determining that the packet is a signaling bearer packet, modifying the first transmission rank to a second transmission rank, the second transmission rank comprising a lower rank than the first transmission rank reported by the user equipment.

In certain embodiments, the network node comprises multiple antennas, and the user equipment is configured to receive a downlink transmission from multiple antennas. The second transmission rank may be 1. Determining whether the packet is a signaling bearer packet or a data bearer packet may be based at least in part on a priority of the packet.

In certain embodiments, the channel state information may further comprise a channel quality indicator and a precoding matrix indicator, the precoding matrix indicator providing an indication of a first precoding matrix corresponding to the first transmission rank reported by the user equipment. The method may further comprise modifying the channel quality indicator based at least in part on the second transmission rank, and determining a second precoding matrix corresponding to the second transmission rank. Determining the second precoding matrix corresponding to the second transmission rank may comprise determining the second precoding matrix corresponding to the second transmission rank according to a mapping table, the mapping table indicating the second precoding matrix corresponding to the second transmission rank based at least in part on the first transmission rank reported by the user equipment and the precoding matrix indicator. In certain embodiments, the method further comprises scheduling the packet for downlink transmission based at least in part on the second transmission rank and the determined second precoding matrix corresponding to the second transmission rank.

Also disclosed is a network node. The network node comprises one or more processors. The one or more processors are configured to receive channel state information from a user equipment, the channel state information comprising a first transmission rank reported by the user equipment for downlink transmission of a packet. The one or more processors are configured to determine whether the packet is a signaling bearer packet or a data bearer packet, and upon determining that the packet is a signaling bearer packet, modify the first transmission rank to a second transmission rank, the second transmission rank comprising a lower rank than the first transmission rank reported by the user equipment.

Also disclosed is a method in a user equipment. The method comprises communicating channel state information to a network node, the channel state information comprising a first transmission rank reported by the user equipment for downlink transmission of a packet, the packet comprising a signaling bearer packet. The method further comprises receiving the packet from the network node, the received packet scheduled using a second transmission rank, the second transmission rank comprising a lower rank than the first transmission rank reported by the user equipment.

In certain embodiments, the user equipment may be configured to receive a downlink transmission from multiple antennas, and the network node comprises multiple antennas. The second transmission rank may be 1. In certain embodiments, the channel state information communicated to the network node further comprises a precoding matrix indicator providing an indication of a first precoding matrix corresponding to the first transmission rank reported by the user equipment, and the received packet comprises a signaling bearer packet scheduled based at least in part on the second transmission rank and a second precoding matrix corresponding to the second transmission rank. The second precoding matrix corresponding to the second transmission rank may be determined according to a mapping table, the mapping table indicating the second precoding matrix corresponding to the second transmission rank based at least in part on the first transmission rank reported by the user equipment and the precoding matrix indicator. The received packet may be scheduled using the second transmission rank and the second precoding matrix corresponding to the second transmission rank based at least in part on a determination that the packet is a signaling bearer packet.

Also disclosed is a user equipment. The user equipment comprises one or more processors. The one or more processors are configured to communicate channel state information to a network node, the channel state information comprising a first transmission rank reported by the user equipment for downlink transmission of a packet, the packet comprising a signaling bearer packet. The one or more processors are configured to receive the packet from the network node, the received packet scheduled using a second transmission rank, the second transmission rank comprising a lower rank than the first transmission rank reported by the user equipment.

Certain embodiments may have one or more technical advantages. For example, in certain embodiments, transmission of signaling bearer messages may be made more reliable. As another example, handover performance in particular may be improved in UEs configured to receive transmissions from multiple transmit antennas. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, HO performance and call retainability are key performance indications when setting up a mobile network. Thus, it may be desirable to avoid dropped calls and long HO interruptions. HO failure is often due to transmission failure of key HO signaling messages, such as, for example, the RRC Connection Reconfiguration message. Thus, there is a need for a more reliable method of transmitting key signaling messages. This need may be especially great when network nodes are deployed with multiple antennas, and a UE is configured to receive a signaling transmission from multiple antennas. In certain embodiments, a network node may receive CSI from a UE. The CSI may include a first transmission rank reported by the UE for downlink transmission of a packet. The network node may determine whether the packet is a signaling bearer packet or a data bearer packet. If the network node determines that the packet is a signaling bearer packet, the network node may modify the first transmission rank to a second transmission rank. The second transmission rank may be lower than the first transmission rank reported by the UE. A lower transmission rank may be a transmission rank with a smaller number. The network node may also determine a second PMI, and make modifications to the modulation and coding used. In certain embodiments, this may improve the reliability of transmitting a signaling bearer packet, such as, for example, an RRC Connection Reconfiguration message (i.e, SRB) used in handover.

Figure 1:
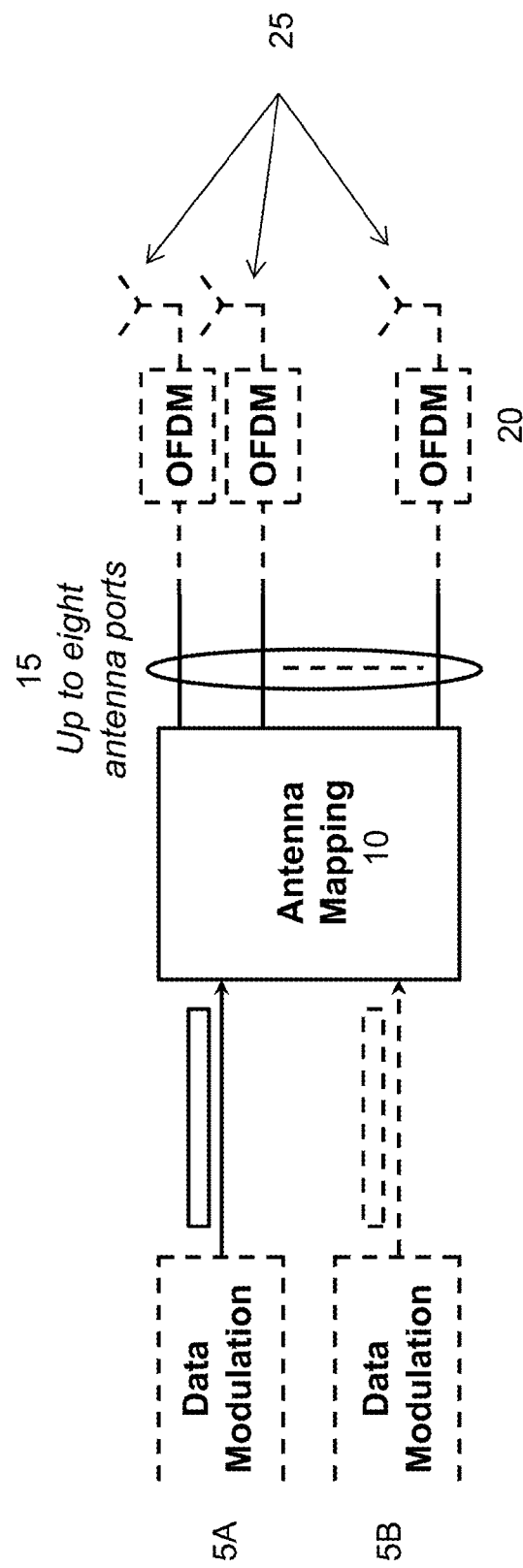
FIG. 1 is a schematic diagram of an example of multi-antenna transmission in LTE.
Figure 2:
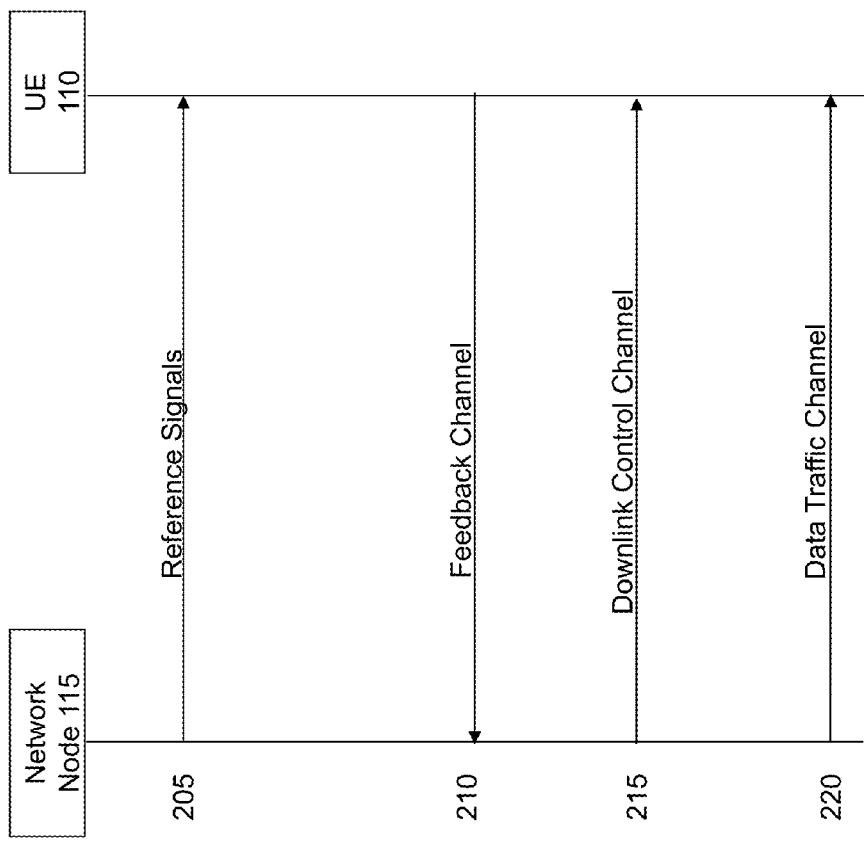
FIG. 2 illustrates an example signal flow diagram of downlink data transfer in LTE.
Figure 3:
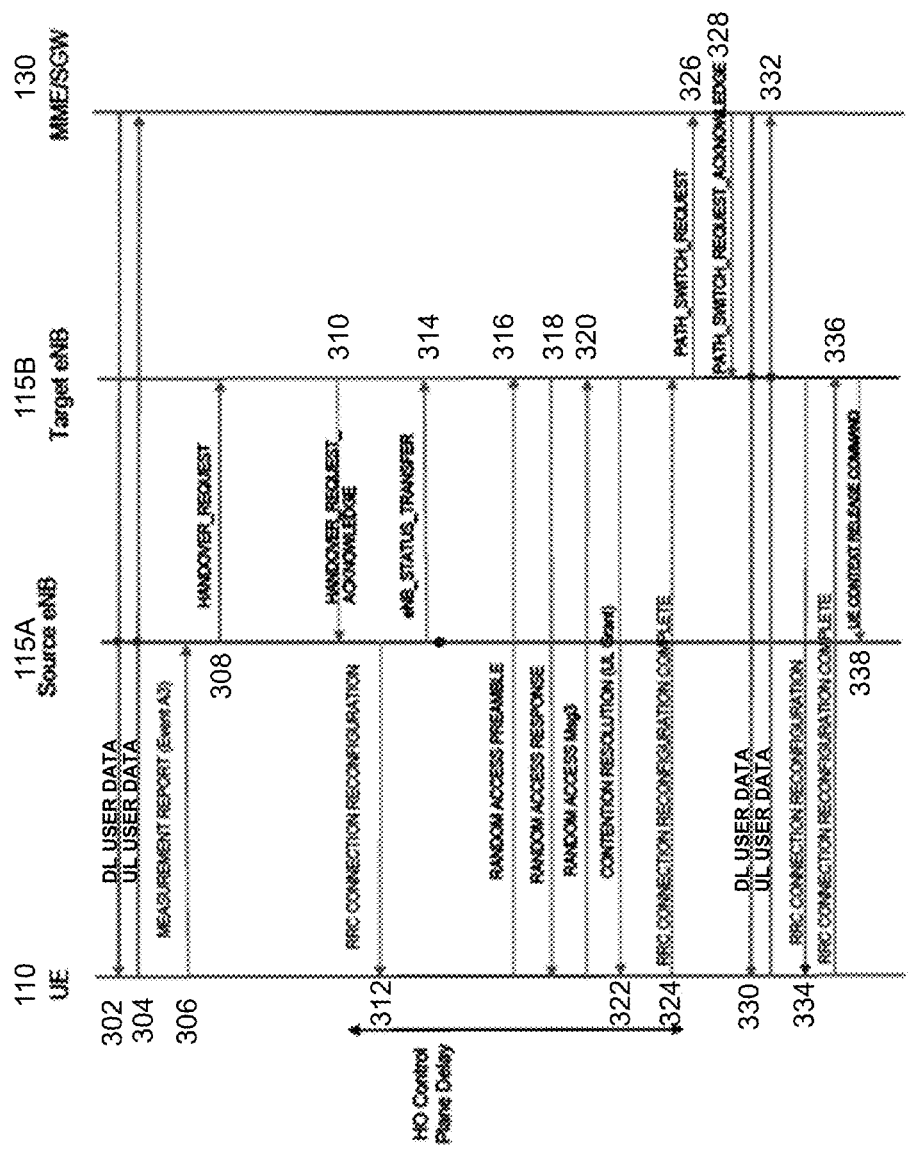
FIG. 3 illustrates an example signal flow diagram of LTE handover.
Figure 4:
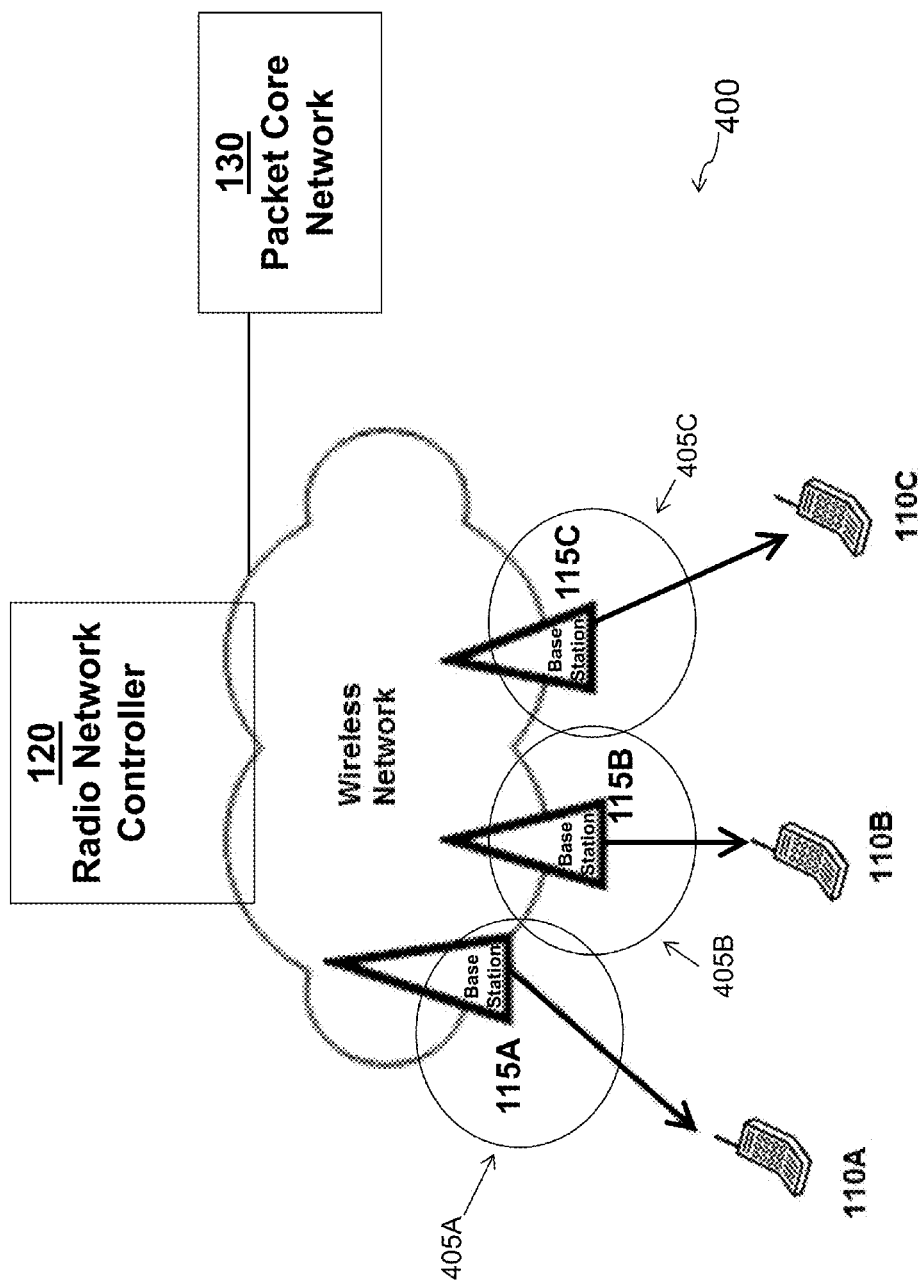
FIG. 4 is a block diagram illustrating an embodiment of a wireless communications network, in accordance with certain embodiments.

FIG. 4 illustrates an example wireless communications network 400, in accordance with certain embodiments. Network 400 includes one or more wireless device(s) 110 (which may be interchangeably referred to as UEs 110), radio network node(s) 115 (which may be interchangeably referred to as eNBs 115), radio network controller(s) 120, and core network node(s) 130. Although FIG. 4 illustrates a particular configuration of network 400 including wireless devices 110A, 110B, and 110C, and network nodes 115A, 115B, and 115C, the present disclosure contemplates that network 400 may have any suitable configuration, including any suitable number of wireless devices 110 and/or network nodes 115.

A wireless device 110 may communicate with a radio network node 115 over a wireless interface. For example, wireless device 110A may transmit wireless signals to radio network node 115A and/or receive wireless signals from radio network node 115A. The wireless signals may contain voice traffic, data traffic, control signals, and/or any other suitable information. In certain embodiments, network nodes 115A-C may be deployed with multiple antennas, and wireless devices 110A-C may be configured to receive transmissions from multiple antennas. In some embodiments, an area of wireless signal coverage associated with a radio network node 115 may be referred to as a cell. For example, network nodes 115A, 115B, and 115C may be associated with wireless signal coverage areas (or cells) 405A, 405B, and 405C, respectively.

Radio network nodes 115 may interface with radio network controller 120. Radio network controller 120 may control radio network nodes 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding.

In some embodiments, core network node 130 may manage the establishment of communication sessions and various other functionalities for wireless devices 110. Wireless devices 110 may exchange certain signals with core network node 130 using the non-access stratum layer. In non-access stratum signaling, signals between wireless devices 110 and core network node 130 may be transparently passed through the radio access network. Example embodiments of wireless devices 110, radio network nodes 115, and other network nodes (such as radio network controller 120 or core network node 130) are described with respect to FIGS. 8, 9, and 10, respectively.

In general, a wireless device 110 may be located in a given cell of network 400. For example, wireless device 110A may be located in cell 405A served by radio network node 115A. At some point, wireless device 110A may move to the cell border between cell 405A served by radio network node 115A and cell 405B served by radio network node 115B. Under such circumstances, a handover procedure may be initiated from network node 115A (i.e., a serving node) to network node 115B (i.e., a target node).

As described above, wireless device 110A may, when on the cell border, transmit an RRC Measurement Report to network node 115A. At the same time, network node 115A may send a HO request to network node 115B. Network node 115B will acknowledge the HO request, which causes network node 115A to send an RRC Connection Reconfiguration message, also known as an SRB, to UE 110A. The SRB instructs UE 110 to the new cell by means of the PCI, carrier frequency, antenna ports, etc. It may be desirable that the SRB be reliably transmitted to UE 110A to prevent HO failure. In certain embodiments, network nodes 115A and 115B may be deployed with multiple antennas, and UE 110A may be configured to receive transmission from multiple antennas. In such a scenario, handover performance becomes more critical because UE 110A may report a higher transmission rank at the cell edges.

Recall that UE 110A, as part of downlink transmission, may communicate CSI information to network node 115A. The CSI may include any suitable information, including rank information (which may be referred to interchangeably as transmission rank), PMI, and CQI. In the 3GPP LTE standard, separate codebooks are defined for various combinations of the number of transmit antennas and the number of transmission layers. The number of transmission layers is also referred to as rank information. Thus, the rank information reported by UE 110A as part of the CSI indicates the number of transmission layers UE 110A would prefer be used by network node 115A for downlink transmission of a packet. The PMI included in the CSI reported by UE 110A indicates a codebook index of the precoding matrix that should be applied to the transmission.

For example, Table 1 below shows a PMI codebook for 4 transmit antennas. A total of 64 precoding vectors and matrices are defined for a MIMO system having 4 transmit antennas. For each rank (i.e., number of transmission layers) in the codebook for the scenarios of rank information equals 1, 2, 3, and 4, sixteen elements per rank are defined. The different elements correspond to different codebook indices. In general, the lower the number of the transmission rank, the higher the reliability of the transmission. Conversely, the higher the number of the transmission rank, the lower the reliability. Thus, a transmission rank of 1 would be the most reliable, and a transmission rank of 4 would be the least reliable.

TABLE 1

PMI Codebook for 4 Transmit Antennas

| Codebook index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$P_{PMI} = I_4 - (2u_{PMI}u_{PMI}^H/\|u_{PMI}\|^2)$, one could obtain the precoding matrix $W_{PMI}$ for different ranks by selecting/permuting the appropriate columns of matrix $P_{PMI}$ for the considered PMI, as given in TS36.211 V8.9.0, section 6.3.4.2.3.

As described above, the interference pattern can change dynamically at the cell edge. Thus, there might be less interference in the neighbor cell served by network node 115B at the time of CSI reporting, but at the time of data transfer (both data and signaling) there might be high interference. As a result of the variability of interference at the cell border, UE 110A may report a higher transmission rank. In the scenario where UE 110A needs to be handed over to target node 115B, the higher transmission rank may make transmission of the SRB to UE 110A unreliable, resulting in problems with the HO procedure.

In certain embodiments, network node 115A may modify the transmission rank reported by UE 110A to a second transmission rank for transmission of the SRB. The second transmission rank may be lower than the transmission rank reported by UE 110A, even though UE 110A may prefer a higher transmission rank when it is receiving data from a network node with multiple antennas. For example, the second transmission rank may have a lower number than the first transmission rank reported by UE 110A. In certain embodiments, the second transmission rank may be the lowest possible rank. For example, there may be four available transmission ranks 1, 2, 3, and 4 from which UE 110A can choose. UE 110A may report a first transmission rank of 4. Network node 115A may modify the first transmission rank to a lower rank, such as 1, 2, or 3. In certain embodiments, network node 115A may modify the first transmission rank to a second transmission rank of 1, which may be the most reliable rank. The serving node 115A may then schedule the SRB using the second transmission rank. This may be advantageous in that it increases the reliability of the subsequent transmission of the SRB to UE 110A.

In certain embodiments, in addition to modifying the first transmission rank reported by UE 110A for downlink transmission of the SRB to a lower second transmission rank, network node 115A may make adjustments to other transmission parameters. Recall that the CSI information may, in addition to the rank information, include a PMI. The PMI provides an indication of the codebook index of the precoding matrix to be used for downlink transmission of a packet. Thus, in certain embodiments UE 110A may also have reported a PMI indicating the codebook index of the precoding matrix to be used in downlink transmission of a packet. Thus, when network node 115A modifies the first transmission rank reported by UE 110A to the lower second transmission rank, network node 115A may also have to determine a second precoding matrix corresponding to the second transmission rank.

To illustrate, consider the following example. Assume that UE 110A communicated CSI to network node 115A. Assume further, for example, that UE 110 reported in the CSI a transmission rank of 4 and a PMI of 10. Network node 115A may determine that the packet for downlink transmission is an SRB, and upon making such a determination may modify the first transmission rank reported by UE 110A to a second, lower transmission rank for scheduling the SRB. For example, network node 115A may modify the first transmission rank from Rank=4 to a second transmission of Rank=1. Network node 115A may need to determine a second precoding matrix corresponding to the second transmission rank.

In certain embodiments, network node 115A may determine the second precoding matrix corresponding to the second transmission rank based on a PMI Codebook such as the one illustrated in Table 1. The second precoding matrix corresponding to the second transmission rank may be determined based on the codebook index indicated by the PMI included in the CSI reported by UE 110A and the second transmission rank. Recall that in the current example UE 110A reported a transmission rank of 4 and a PMI of 10. Hence, according to Table 1 above, UE 110 reports $W_{10}^{\{1324\}}/2$ as the best (i.e., preferred) precoding matrix. In other words, the preferred precoding matrix as reported by UE 110A is found where the row containing codebook index 10 (indicated by the PMI reported by UE 110A) intersects with the column for 4 transmission layers (which corresponds to the transmission rank of 4 reported by UE 110).

If network node 115A modifies the first transmission rank reported by UE 110A to a lower second transmission rank, such as, for example, a transmission rank of 1, and schedules the SRB with Rank=1, network node 115A must still determine a second precoding matrix corresponding to the second transmission rank. The second precoding matrix corresponding to the second transmission rank may be determined in any suitable manner. For instance, in the current example, network node 115A will schedule the SRB with RI=1, and a second precoding matrix that corresponds to the intersection in Table 1 of the codebook index 10 indicated by the PMI reported by UE 110A and the column corresponding to 1 transmission layer (which corresponds to a rank of 1). This gives a second precoding matrix of $W_{10}^{\{1\}}$. In other words, in certain embodiments network node 115A will schedule the SRB using the second precoding matrix indicated by the intersection of the row containing the codebook index indicated by the PMI reported by the UE and the column having the number of transmission layers corresponding to the second transmission rank modified by network node 115.

In certain embodiments, network node 115A may determine the second precoding matrix corresponding to the second transmission rank using a mapping table. An example mapping table is illustrated below in Table 2. In Table 2, the first column corresponds to the UE reported codebook index indicated by a PMI reported in CSI, and the second through fourth columns (RI=2, RI=3, and RI=4, respectively) correspond to the first transmission rank reported by UE 110A as part of the CSI.

TABLE 2

PMI mapping at the eNode B

| UE reported Codebook index | eNode B chosen column from the UE reported PMI | | |
|---|---|---|---|
| | RI = 2 | RI = 3 | RI = 4 |
| 0 | 1 | 1 | 1 |
| 1 | 1 | 1 | 1 |
| 2 | 1 | 1 | 3 |
| 3 | 1 | 1 | 3 |
| 4 | 1 | 1 | 1 |
| 5 | 1 | 1 | 1 |
| 6 | 1 | 1 | 1 |
| 7 | 1 | 1 | 1 |
| 8 | 1 | 1 | 1 |
| 9 | 1 | 1 | 1 |
| 10 | 1 | 1 | 1 |
| 11 | 1 | 1 | 1 |
| 12 | 1 | 1 | 1 |
| 13 | 1 | 1 | 1 |
| 14 | 1 | 1 | 3 |
| 15 | 1 | 1 | 1 |

To illustrate, recall in the current example that UE 110A reported a transmission rank of 4 and a first PMI=10. In such a case, network node 115A may refer to the mapping table above to determine the second precoding matrix corresponding to the second transmission rank. Using the PMI reported by UE 110A, network node 115A may determine the appropriate codebook index in Table 2. Based on the reported rank information of 4, network node 115A chooses the appropriate column, in this case column 4. The value located where the determined row and column intersect, in this case 1, provides an indication of the second precoding matrix from Table 1 that should be used to transmit the SRB. Thus, in the current example, Table 2 would indicate to network node 115A that the second precoding matrix corresponding to the second transmission rank is $W_{10}^{\{1\}}$, which is found in Table 1 at the intersection of the column corresponding to 1 transmission layer (i.e., rank 1) at the row corresponding to the codebook index indicated by the PMI.

Figure 5:
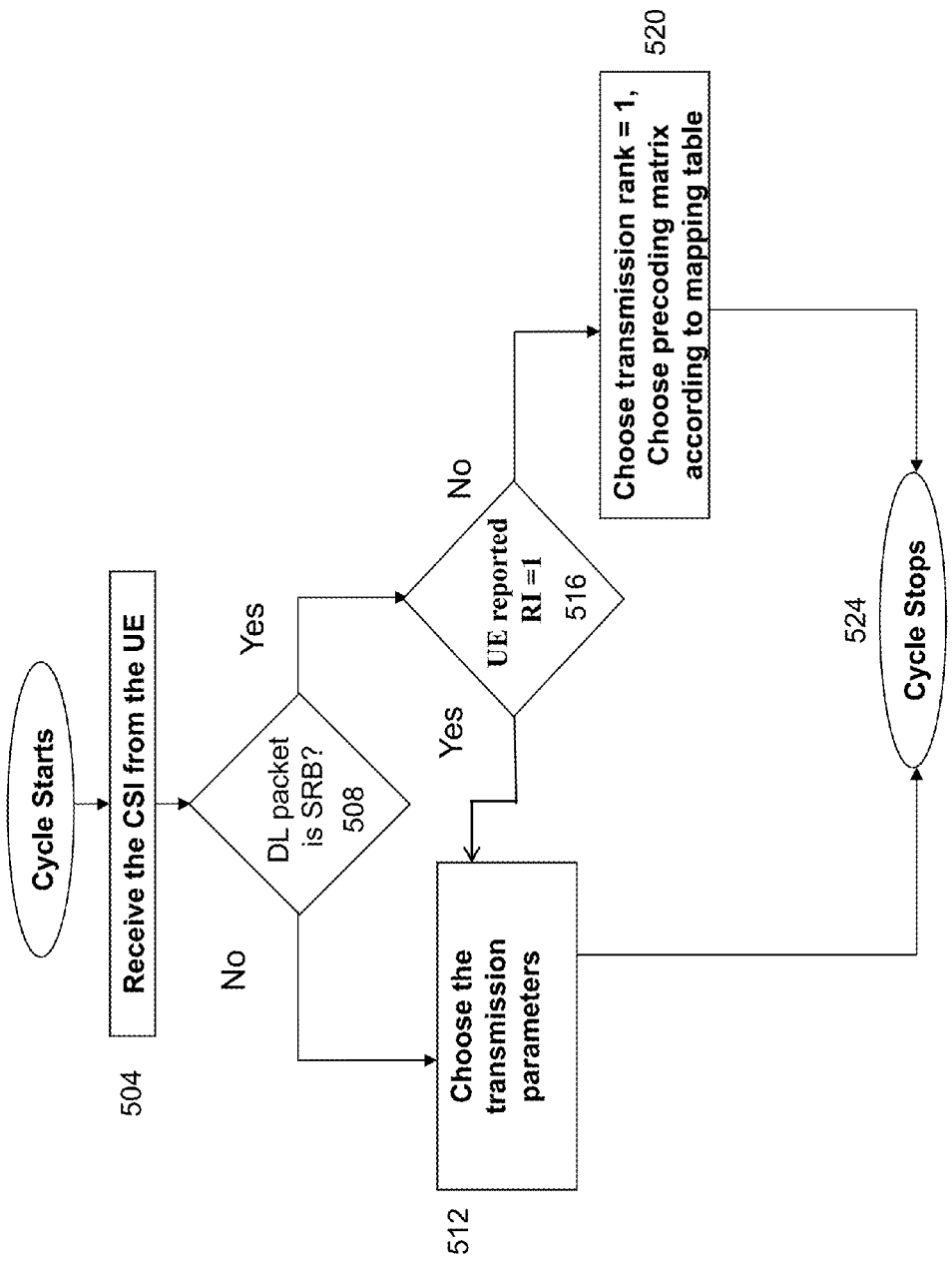
FIG. 5 is a flow chart of a method in a network node, in accordance with an embodiment.

FIG. 5 is a flow chart of a method in a network node, in accordance with an embodiment. The method begins at step 504, when the network node receives channel state information from the UE. As described above, the channel state information may include any suitable information. For example, the channel state information may include one or more of rank information, a channel quality indicator, precoding matrix indicator, best sub bands, or any other suitable information.

At decision point 508, the network node determines whether a packet for downlink transmission is a signaling radio bearer. In certain embodiments, a scheduler associated with the network node may determine whether the current packet for downlink transmission is either a signaling bearer or a data bearer (i.e., whether it is an RRC message or a data block). The determination of whether the current packet for downlink transmission is either signaling bearer or data bearer may be made in any suitable manner. For example, in certain embodiments the determination may be based on a priority of the packet. If the network node determines that the packet for downlink transmission is not a signaling radio bearer, the method proceeds to step 512, where transmission parameters are chosen. The transmission parameters may be chosen in any suitable manner. For example, the transmission parameters may be chosen according to conventional methods, which may vary across wireless networks and providers. As one example, the transmission parameters may be chosen according to the channel state information reported by the UE. For example, the packet may be scheduled for transmission using the rank information and PMI reported by the UE.

If the network node determines that the packet for downlink transmission is a signaling radio bearer, the method proceeds to decision point 516, where the network node determines whether the UE reported a transmission rank equal to 1. If the network node determines that the UE reported a transmission rank equal to 1, the method proceeds to step 512, and the network node chooses transmission parameters as described above.

If the network node determines that the transmission rank reported by the UE is not equal to 1, the method proceeds to step 520. At step 520, the network node chooses a second transmission rank equal to 1 for downlink transmission of the packet. Also at step 520, the network node may determine a second precoding matrix corresponding to the second transmission rank. In certain embodiments, the second precoding matrix corresponding to the second transmission rank may be chosen using a mapping table, such as the mapping table described above in relation to Table 2. In certain embodiments, the network node may also adjust the CQI. The adjustment to the CQI may be CQI plus delta, where delta may be a constant ranging from 0 to 15.

At step 524, the packet is ready for scheduling and the cycle stops. In certain embodiments, the network node may schedule the packet.

Figure 6:
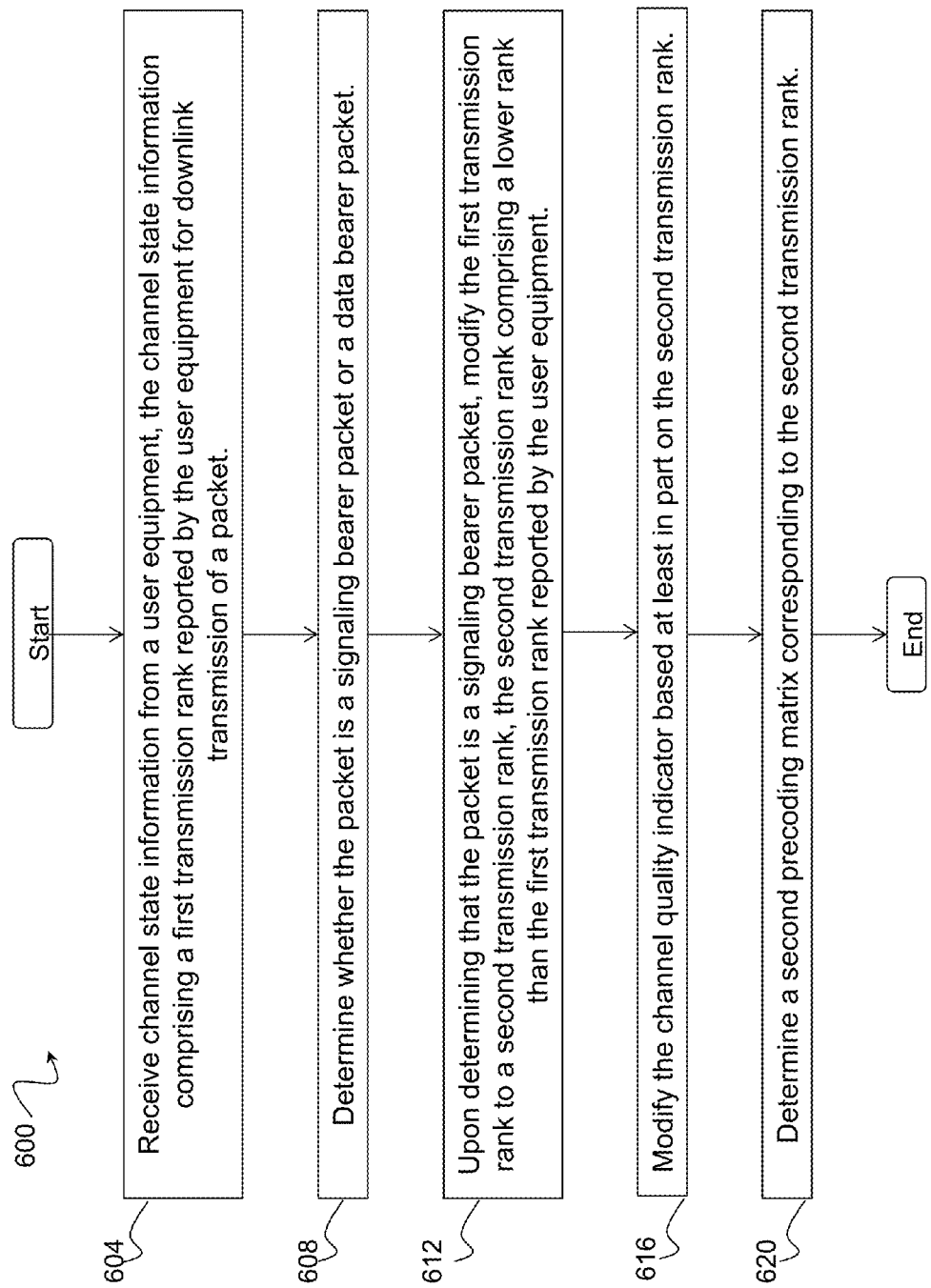
FIG. 6 is a flow chart illustrating a method in a network node, in accordance with an embodiment.

FIG. 6 is a flow chart illustrating a method in a network node, in accordance with an embodiment. The method begins at step 604, when the network node receives channel state information from a user equipment, the channel state information comprising a first transmission rank reported by the user equipment for downlink transmission of a packet. In certain embodiments, the network node may have multiple antennas, and the user equipment may be configured to receive a downlink transmission from multiple antennas. The channel state information may include any other suitable information. For example, in certain embodiments, the channel state information may also include a channel quality indicator and a precoding matrix indicator, the precoding matrix indicator providing an indication of a first precoding matrix corresponding to the first transmission rank reported by the user equipment.

At step 608, the network node determines whether the packet is a signaling bearer packet or a data bearer packet. The network node may determine whether the packet is a signaling bearer packet or a data bearer packet in any suitable manner. For example, in certain embodiments the network node may determine whether the packet is a signaling bearer packet or a data bearer packet based at least in part on a priority of the packet.

At step 612, upon determining that the packet is a signaling bearer packet, the network node modifies the first transmission rank to a second transmission rank, the second transmission rank comprising a lower rank than the first transmission rank reported by the user equipment. In certain embodiments, the second transmission rank comprising a lower rank than the first transmission rank reported by the user equipment may be a rank with a smaller number. In certain embodiments, the second transmission rank may be 1.

As described above, the channel state information may include a channel quality indicator and a precoding matrix indicator providing an indication of a first precoding matrix corresponding to the first transmission rank reported by the user equipment. At step 616, the network node modifies the channel quality indicator based at least in part on the second transmission rank. At step 620, the network node determines a second precoding matrix corresponding to the second transmission rank. In certain embodiments, determining the second precoding matrix corresponding to the second transmission rank comprises determining the second precoding matrix corresponding to the second transmission rank according to a mapping table. The mapping table may indicate the second precoding matrix corresponding to the second transmission rank based at least in part on the first transmission rank reported by the user equipment and the precoding matrix indicator corresponding to the first transmission rank. In certain embodiments, the method may further comprise scheduling the packet for downlink transmission based at least in part on the second transmission rank and the determined second precoding matrix corresponding to the second transmission rank.

Figure 7:
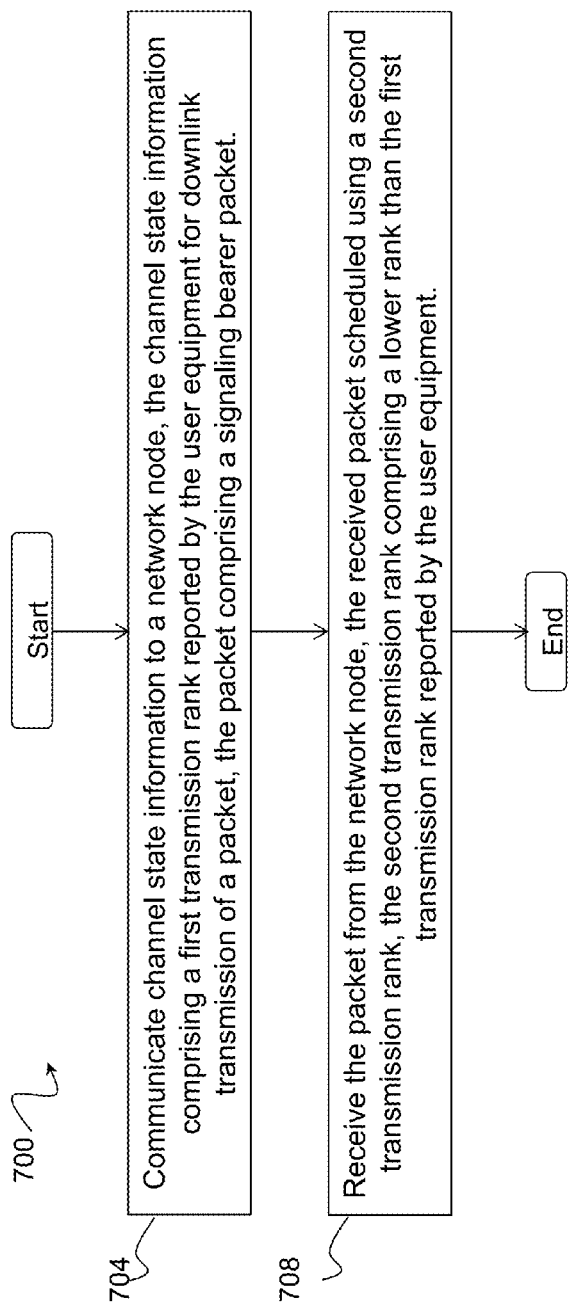
FIG. 7 is a flow chart illustrating a method in a user equipment, in accordance with an embodiment.

FIG. 7 is a flow chart illustrating a method in a user equipment, in accordance with an embodiment. The method begins at step 704, when the user equipment communicates channel state information to a network node, the channel state information comprising a first transmission rank reported by the user equipment for downlink transmission of a packet, the packet comprising a signaling bearer packet. In certain embodiments, the user equipment may be configured to receive a downlink transmission from multiple antennas. The network node may have multiple antennas. The channel state information communicated to the network node may include a precoding matrix indicator providing an indication of a first precoding matrix corresponding to the first transmission rank reported by the user equipment.

At step 708, the user equipment receives the packet from the network node, the received packet scheduled using a second transmission rank, the second transmission rank comprising a lower rank than the first transmission rank reported by the user equipment. In certain embodiments, the second transmission rank comprising a lower rank than the first transmission rank reported by the user equipment may be a rank with a smaller number. The second transmission rank may be 1.

In certain embodiments, the received packet may be a signaling bearer packet scheduled based at least in part on the second transmission rank and a second precoding matrix corresponding to the second transmission rank. The second precoding matrix corresponding to the second transmission rank may be determined according to a mapping table. The mapping table may indicate the second precoding matrix corresponding to the second transmission rank based at least in part on the first transmission rank reported by the user equipment and the precoding matrix indicator corresponding to the first transmission rank. The received packet may be scheduled using the second transmission rank and the second precoding matrix corresponding to the second transmission rank based at least in part on a determination that the packet is a signaling bearer packet.

Throughout the present description, the non-limiting term radio network node or simply network node is used. Although particular examples may be described, the term refers to any type of network node that serves UE and/or connected to other network node or network element or any radio node from where UE receives signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), or any other suitable kind of node.

Similarly, throughout the present disclosure, the non-limiting term UE is used. Although particular examples may be described, the term UE refers to any type of wireless device that communicates with a radio network node in a cellular or mobile communication system. Examples of UE are target device, device-to-device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable device.

Although certain embodiments may be described in particular for LTE/LTE-A, this is for purposes of example only. The various embodiments described herein may be applicable to any suitable wireless technologies. For example, the various embodiments described herein may be applicable to any RAT or multi-RAT system where the UE operates using multiple carriers, such as, for example, LTE FDD/TDD, WCMDA/HSPA, GSM/GERAN, Wi Fi, WLAN, WiMax, CDMA2000, or any other suitable radio access technologies. Moreover, the various embodiments described herein are applicable to single carrier as well as to multicarrier (MC) or carrier aggregation (CA) operation of the UE. The term carrier aggregation (CA) may also be referred to (e.g. interchangeably called) "multi-carrier system", "multi-cell operation", "multi-carrier operation", "multi-carrier" transmission and/or reception. Furthermore, the various embodiments described herein may also be applicable to Multi RAB (radio bearers) on some carriers (that is data plus speech is simultaneously scheduled).

Figure 8:
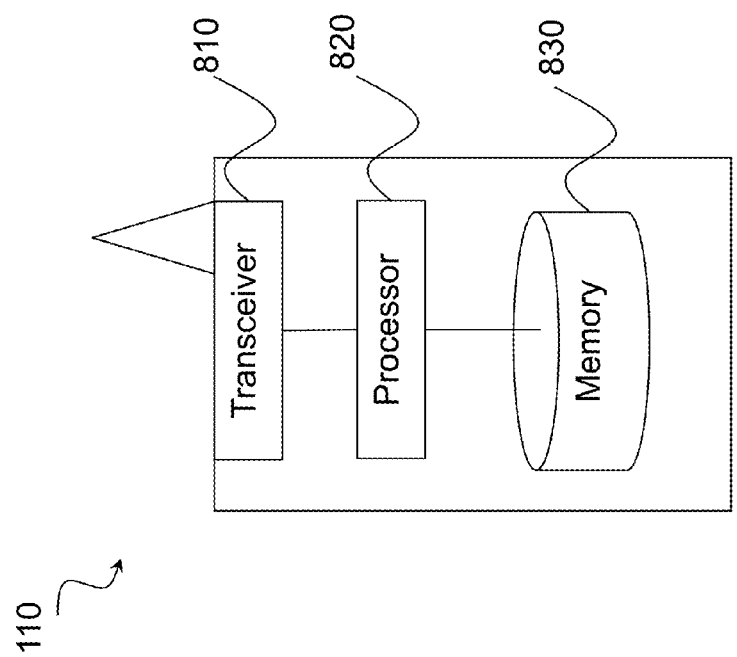
FIG. 8 a block schematic of an exemplary wireless device, in accordance with certain embodiments.

FIG. 8 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 810, processor 820, and memory 830. In some embodiments, transceiver 810 facilitates transmitting wireless signals to and receiving wireless signals from network node 115 (e.g., via an antenna), processor 820 executes instructions to provide some or all of the functionality described above as being provided by wireless device 110, and memory 830 stores the instructions executed by processor 820.

Processor 820 may include any suitable combination of hardware and software implemented in one or more modules to execute instructions and manipulate data to perform some or all of the described functions of wireless device 110. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may determine channel state information, such as, for example, a channel quality indicator, a precoding matrix indicator, and rank information for downlink transmission of a packet. The determining module may include or be included in processor 820. The determining module may include analog and/or digital circuitry configured to perform any of the functions of the determining module and/or processor 820. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may communicate channel state information to a network node. The communication module may include a transmitter and/or a transceiver, such as transceiver 810. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive a packet from a network node. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 9:
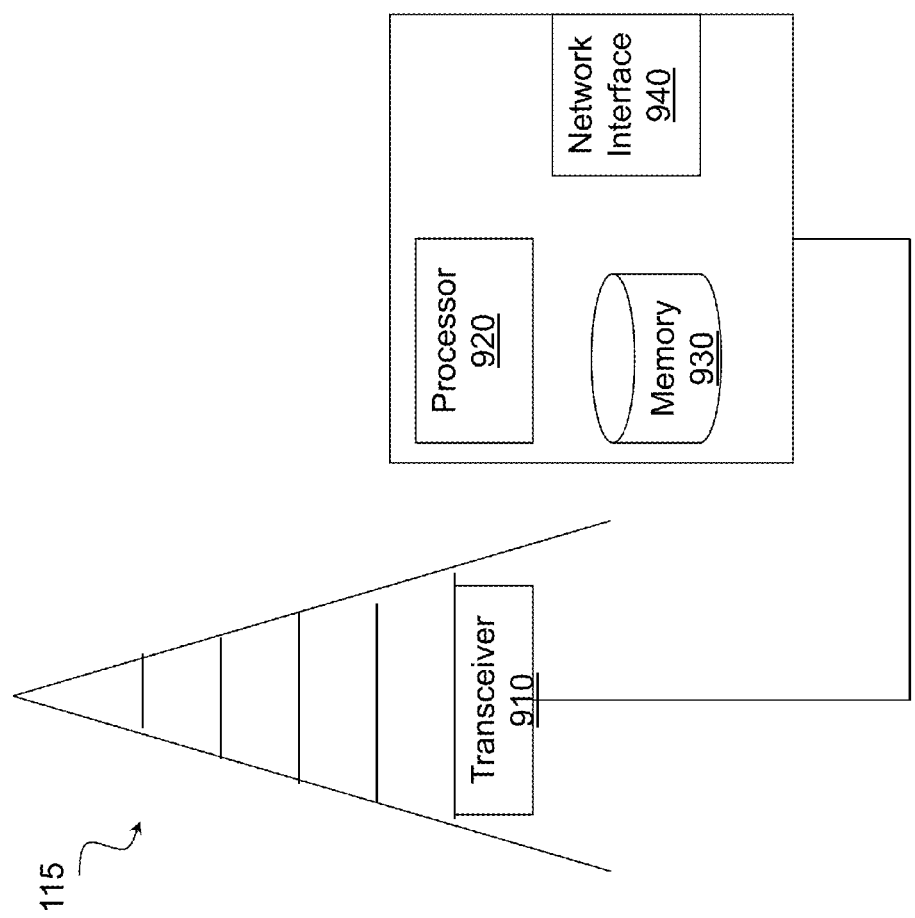
FIG. 9 is a block schematic of an exemplary radio network node, in accordance with certain embodiments.

FIG. 9 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 910, processor 920, memory 930, and network interface 940. In some embodiments, transceiver 910 facilitates transmitting wireless signals to and receiving wireless signals from wireless device 110 (e.g., via an antenna), processor 920 executes instructions to provide some or all of the functionality described above as being provided by a network node 115, memory 930 stores the instructions executed by processor 920, and network interface 940 communicates signals to backend network components, such as a gateway, switch, router, Internet, Public Switched Telephone Network (PSTN), core network nodes 130, radio network controllers 120, etc.

Processor 920 may include any suitable combination of hardware and software implemented in one or more modules to execute instructions and manipulate data to perform some or all of the described functions of network node 115. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for network node 115, send output from network node 115, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

In certain embodiments, network node 115 may include a determining module, a scheduling module, a communication module, a receiving module, and any other suitable modules. In some embodiments, one or more of the determining module, communication module, receiving module, or any other suitable module may be implemented using one or more processors 920 of FIG. 9. In certain embodiments, the functions of two or more of the various modules may be combined into a single module.

The determining module may perform the processing functions of network node 115. For example, the determining module may determine whether a packet is a signaling bearer packet or a data bearer packet. As another example, the determining module may, upon determining that the packet is a signaling bearer packet, modify a first transmission rank to a second transmission rank, the second transmission rank comprising a lower rank than the first transmission rank. As yet another example, the determining module may modify a channel quality indicator based at least in part on the second transmission rank, and may determine a second precoding matrix indicator corresponding to the second transmission rank. In certain embodiments, the determining module may determine the second precoding matrix indicator corresponding to the second transmission rank according to a mapping table. In general, the scheduling module may schedule one or packets for transmission. For example, in certain embodiments, the scheduling module may schedule a packet for downlink transmission based at least in part on the second transmission rank and the determined second precoding matrix indicator corresponding to the second transmission rank.

The communication module may perform the transmission functions of network node 115. The communication module may transmit messages to one or more of wireless devices 110. For example, the communication module may communicate a scheduled packet for downlink transmission to the user equipment. The communication module may include a transmitter and/or a transceiver, such as transceiver 910. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may receive channel state information from a user equipment. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 9 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 10:
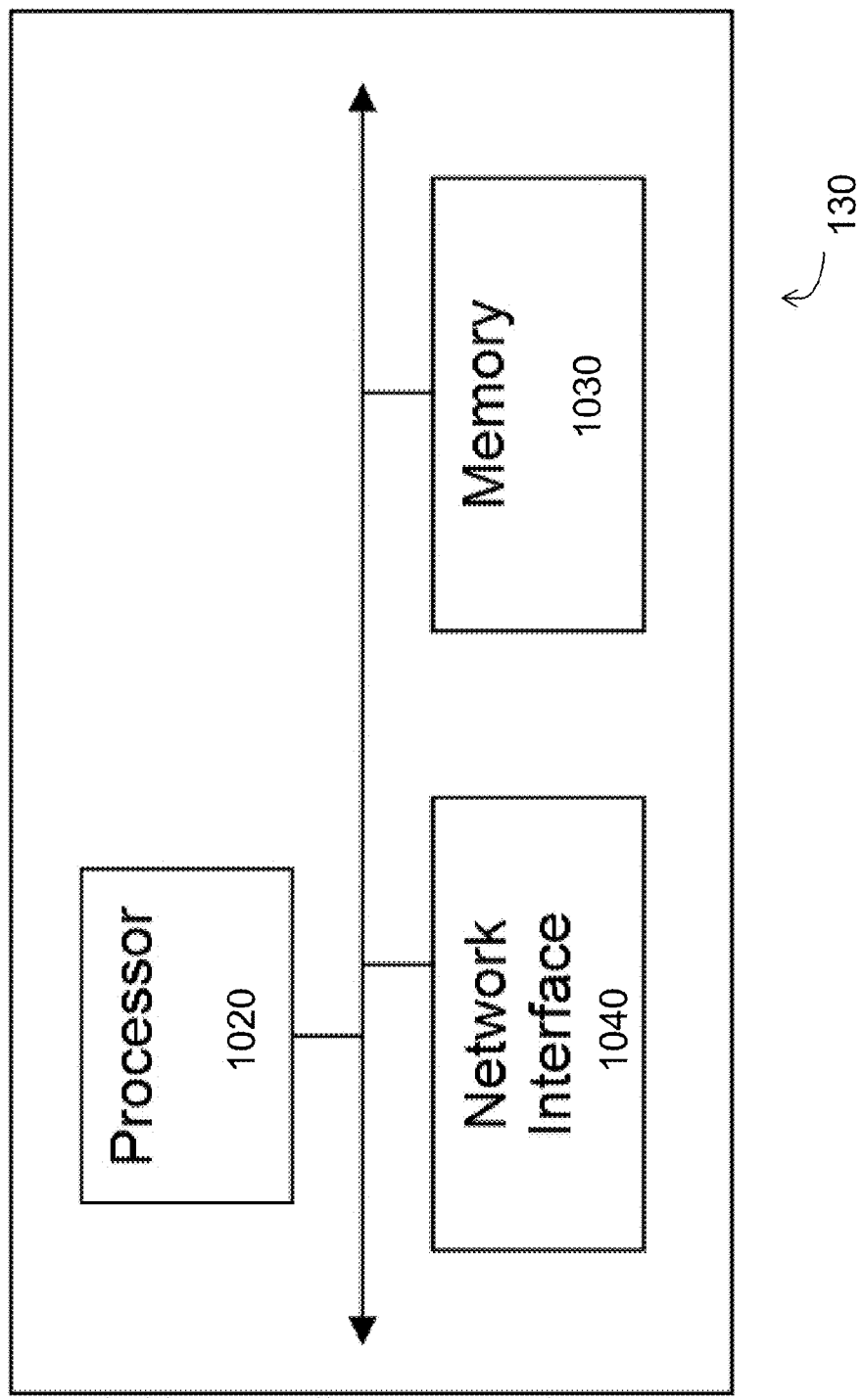
FIG. 10 is a block schematic of an exemplary radio network controller or core network node, in accordance with certain embodiments.

FIG. 10 is a block schematic of an exemplary radio network controller 120 or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 120 or core network node 130 include processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to any suitable node, such as a gateway, switch, router, Internet, Public Switched Telephone Network (PSTN), network nodes 115, radio network controllers 120, core network nodes 130, etc.

Processor 1020 may include any suitable combination of hardware and software implemented in one or more modules to execute instructions and manipulate data to perform some or all of the described functions of the radio network controller 120 or core network node 130. In some embodiments, processor 920 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
MIMO Multiple Input Multiple Output
Tx Transmitter
HSDPA High Speed Downlink Packet Access
DCI Downlink Control Index
HARQ Hybrid Automatic Repeat Request
CRC Cyclic Redundancy Check
NAK Non-Acknowledgement
ACK Acknowledgement
UE User Equipment
CQI Channel Quality Information
MMSE Minimum Mean Square Error
ML Maximum Likelihood
MAP Maximum Aposteriori Probability
TTI Transmit Time Interval
PMI Precoding Matrix Indicator
PCI Precoding Control index
BS Base Station
D2D Device-to-Device
HD Half Duplex
M2M Machine-To-Machine
MTC Machine-Type Communication
UE User Equipment
eNB Evolved Node B, Base Station
E-UTRAN Evolved Universal Terrestrial Radio Access Network
E-UTRA Evolved Universal Terrestrial Radio Access
E-UTRA FDD E-UTRA Frequency Division Duplex
E-UTRA TDD E-UTRA Time Division Duplex
LTE Long Term Evolution
RAT Radio Access Technology
RRC Radio Resource Control
TDD Time Division Duplex
BSC Base Station Controller
HSPA High Speed Packet Access
GSM Global System for Mobile Communication
UTRA Universal Terrestrial Radio access
UTRA FDD UTRA Frequency Division Duplex
UTRA TDD UTRA Time Division Duplex
WLAN Wireless Local Area Network
GERAN GSM EDGE Radio Access Network
EDGE Enhanced Data Rates for GSM Evolution
CDMA2000 Code Division Multiple Access 2000
HRPD High Rate Packet Data
DL Downlink
PDCCH Physical Downlink Control Channel
PCFICH Physical Control Format Indicator
PDSCH Physical Downlink Shared Channel
PHICH Physical Hybrid ARQ Indicator Channel
RE Resource Element
RB Resource Block
RS Reference Signal
SINR Signal-to-Interference Ratio

The invention claimed is:

1. A method in a first network node, comprising:
receiving channel state information from a user equipment, the channel state information comprising:
a first transmission rank reported by the user equipment for one or more subsequent downlink transmissions to the user equipment, wherein the first transmission rank is greater than 1;
a channel quality indicator; and
a precoding matrix indicator, the precoding matrix indicator providing an indication of a first precoding matrix corresponding to the first transmission rank reported by the user equipment;
determining whether the user equipment should be handed over to a second network node;
upon determining that the user equipment should be handed over to the second network node, modifying the first transmission rank to a second transmission rank, the second transmission rank comprising a lower rank than the first transmission rank reported by the user equipment;
modifying the channel quality indicator based at least in part on the second transmission rank;
determining a second precoding matrix corresponding to the second transmission rank; and
transmitting a signaling radio bearer message associated with a handover procedure to the user equipment using the second transmission rank.

2. The method of claim 1, wherein the second transmission rank is 1.

3. The method of claim 1, wherein determining the second precoding matrix corresponding to the second transmission rank comprises:
determining the second precoding matrix corresponding to the second transmission rank according to a mapping table, the mapping table indicating the second precoding matrix corresponding to the second transmission rank based at least in part on the first transmission rank reported by the user equipment and the precoding matrix indicator.

4. The method of claim 1, further comprising scheduling the one or more subsequent downlink transmissions based at least in part on the second transmission rank and the determined second precoding matrix corresponding to the second transmission rank.

5. The method of claim 1, further comprising determining whether a subsequent downlink transmission is a signaling bearer packet or a data packet based at least in part on a priority of the subsequent downlink transmission.

6. The method of claim 1, wherein the first network node comprises multiple antennas, and the user equipment is configured to receive a downlink transmission from multiple antennas.

7. A method in a user equipment, comprising:
communicating channel state information to a network node, the channel state information comprising:
a first transmission rank reported by the user equipment for one or more subsequent downlink transmissions to the user equipment, wherein the first transmission rank is greater than 1;
a channel quality indicator; and
a precoding matrix indicator, the precoding matrix indicator providing an indication of a first precoding matrix corresponding to the first transmission rank reported by the user equipment; and
receiving, from the network node, a signaling radio bearer message associated with a handover procedure, the received signaling radio bearer message scheduled using a second transmission rank, the second transmission rank comprising a lower rank than the first transmission rank reported by the user equipment for the one or more subsequent downlink transmissions to the user equipment, wherein the signaling radio bearer message is scheduled based at least in part on the second transmission rank and a second precoding matrix corresponding to the second transmission rank.

8. The method of claim 7, wherein the second transmission rank is 1.

9. The method of claim 7, wherein the second precoding matrix corresponding to the second transmission rank is determined according to a mapping table, the mapping table indicating the second precoding matrix corresponding to the second transmission rank based at least in part on the first transmission rank reported by the user equipment and the precoding matrix indicator.

10. The method of claim 7, wherein the received signaling radio bearer message is scheduled using the second transmission rank and the second precoding matrix corresponding to the second transmission rank based at least in part on a priority of the signaling radio bearer message associated with the handover procedure.

11. The method of claim 7, wherein:
the method comprises receiving a downlink transmission from multiple antennas; and
the network node comprises multiple antennas.

12. A first network node, comprising:
a receiver;
a transmitter; and
one or more processors coupled to the receiver and the transmitter, the one or more processors configured to:
receive channel state information from a user equipment, the channel state information comprising:
a first transmission rank reported by the user equipment for one or more subsequent downlink transmissions to the user equipment, wherein the first transmission rank is greater than 1;
a channel quality indicator; and
a precoding matrix indicator, the precoding matrix indicator providing an indication of a first precoding matrix corresponding to the first transmission rank reported by the user equipment;
determine whether the user equipment should be handed over to a second network node;
upon determining that the user equipment should be handed over to the second network node, modify the first transmission rank to a second transmission rank, the second transmission rank comprising a lower rank than the first transmission rank reported by the user equipment;
modify the channel quality indicator based at least in part on the second transmission rank;
determine a second precoding matrix corresponding to the second transmission rank; and
transmit a signaling radio bearer message associated with a handover procedure to the user equipment using the second transmission rank.

13. The first network node of claim 12, wherein the second transmission rank is 1.

14. The first network node of claim 12, wherein the one or more processors configured to determine the second precoding matrix corresponding to the second transmission rank comprises one or more processors configured to:
determine the second precoding matrix corresponding to the second transmission rank according to a mapping table, the mapping table indicating the second precoding matrix corresponding to the second transmission rank based at least in part on the first transmission rank reported by the user equipment and the precoding matrix indicator.

15. The first network node of claim 12, wherein the one or more processors are further configured to schedule the one or more subsequent downlink transmissions based at least in part on the second transmission rank and the determined second precoding matrix corresponding to the second transmission rank.

16. The first network node of claim 12, wherein the one or more processors are configured to determine whether a subsequent downlink transmission is a signaling bearer packet or a data bearer packet based at least in part on a priority of the subsequent downlink transmission.

17. The first network node of claim 12, wherein the first network node comprises multiple antennas, and the user equipment is configured to receive a downlink transmission from multiple antennas.

18. A user equipment, comprising:
a receiver;
a transmitter; and
one or more processors coupled to the receiver and the transmitter, the one or more processors configured to:
communicate channel state information to a network node, the channel state information comprising:
a first transmission rank reported by the user equipment for one or more subsequent downlink transmissions to the user equipment, wherein the first transmission rank is greater than 1;
a channel quality indicator; and
a precoding matrix indicator, the precoding matrix indicator providing an indication of a first precoding matrix corresponding to the first transmission rank reported by the user equipment; and
receive, from the network node, a signaling radio bearer message associated with a handover procedure, the received signaling radio bearer message scheduled using a second transmission rank, the second transmission rank comprising a lower rank than the first transmission rank reported by the user equipment for the one or more subsequent downlink transmissions to the user equipment, wherein the signaling radio bearer message is scheduled based at least in part on the second transmission rank and a second precoding matrix corresponding to the second transmission rank.

19. The user equipment of claim 18, wherein the second transmission rank is 1.

20. The user equipment of claim 18, wherein the second precoding matrix corresponding to the second transmission rank is determined according to a mapping table, the mapping table indicating the second precoding matrix corresponding to the second transmission rank based at least in part on the first transmission rank reported by the user equipment and the precoding matrix indicator.

21. The user equipment of claim 18, wherein the received signaling radio bearer message is scheduled using the second transmission rank and the second precoding matrix corresponding to the second transmission rank based at least in part on a priority of the signaling radio bearer message associated with the handover procedure.

22. The user equipment of claim 18, wherein:
the user equipment is configured to receive a downlink transmission from multiple antennas, and the network node comprises multiple antennas.

* * * * *